United States Patent [19]
Rifkin et al.

[11] Patent Number: 5,697,508
[45] Date of Patent: Dec. 16, 1997

[54] TROLLEY AND BAG ASSEMBLY FOR TRANSPORTING HANGER-HUNG GARMENTS

[75] Inventors: Arnold S. Rifkin, Wilkes-Barre; George W. Williams, Nanticoke; John Hutnick, Larksville, all of Pa.

[73] Assignee: A. Rifkin & Co.

[21] Appl. No.: 685,409

[22] Filed: Jul. 24, 1996

[51] Int. Cl.⁶ ........................................ A47F 5/00
[52] U.S. Cl. ....................... 211/162; 211/124; 206/286
[58] Field of Search .......................... 211/162, 124, 211/123, 122, 7; 206/286, 287, 278

[56] References Cited

U.S. PATENT DOCUMENTS

| | | | |
|---|---|---|---|
| 2,224,090 | 12/1940 | Tucker et al. | 206/287 |
| 2,868,390 | 1/1959 | McCrone | 211/124 |
| 3,283,914 | 11/1966 | Robinson | 211/7 X |
| 3,921,814 | 11/1975 | Solomon | 211/124 X |
| 4,037,728 | 7/1977 | Cameron | 211/124 |
| 4,079,840 | 3/1978 | Usner | 211/124 |
| 4,905,826 | 3/1990 | Martin | 206/286 |

*Primary Examiner*—Robert W. Gibson, Jr.
*Attorney, Agent, or Firm*—Michael Ebert

[57] ABSTRACT

A trolley and bag assembly adapted to transport hanger-hung garments on overhead rails from an initial point to other points, the bag protectively shrouding the transported garments. The trolley includes a pair of rolling sheaves that ride on the rails and a spaced pair of side arms depending from the sheaves to support a horizontal load bar onto which is hooked a set of hanger-hung garments. Bridging the side arms is a retractable hold-down bar which when raised above the load bar then permits the hangers to be hooked onto the load bar, and when lowered then clamps the hooks of the hangers so that the garments cannot be dislodged from the trolley.

9 Claims, 4 Drawing Sheets

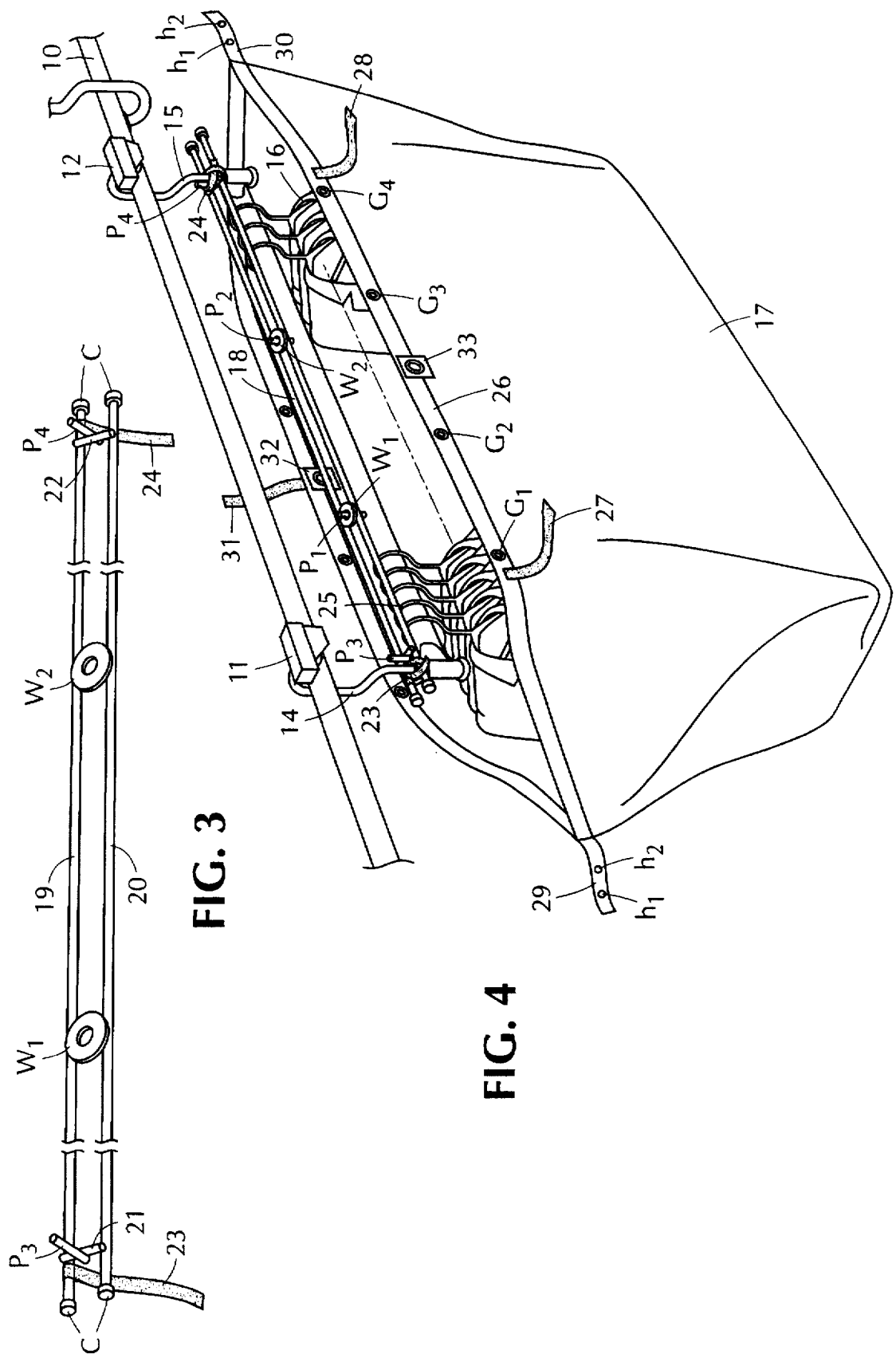

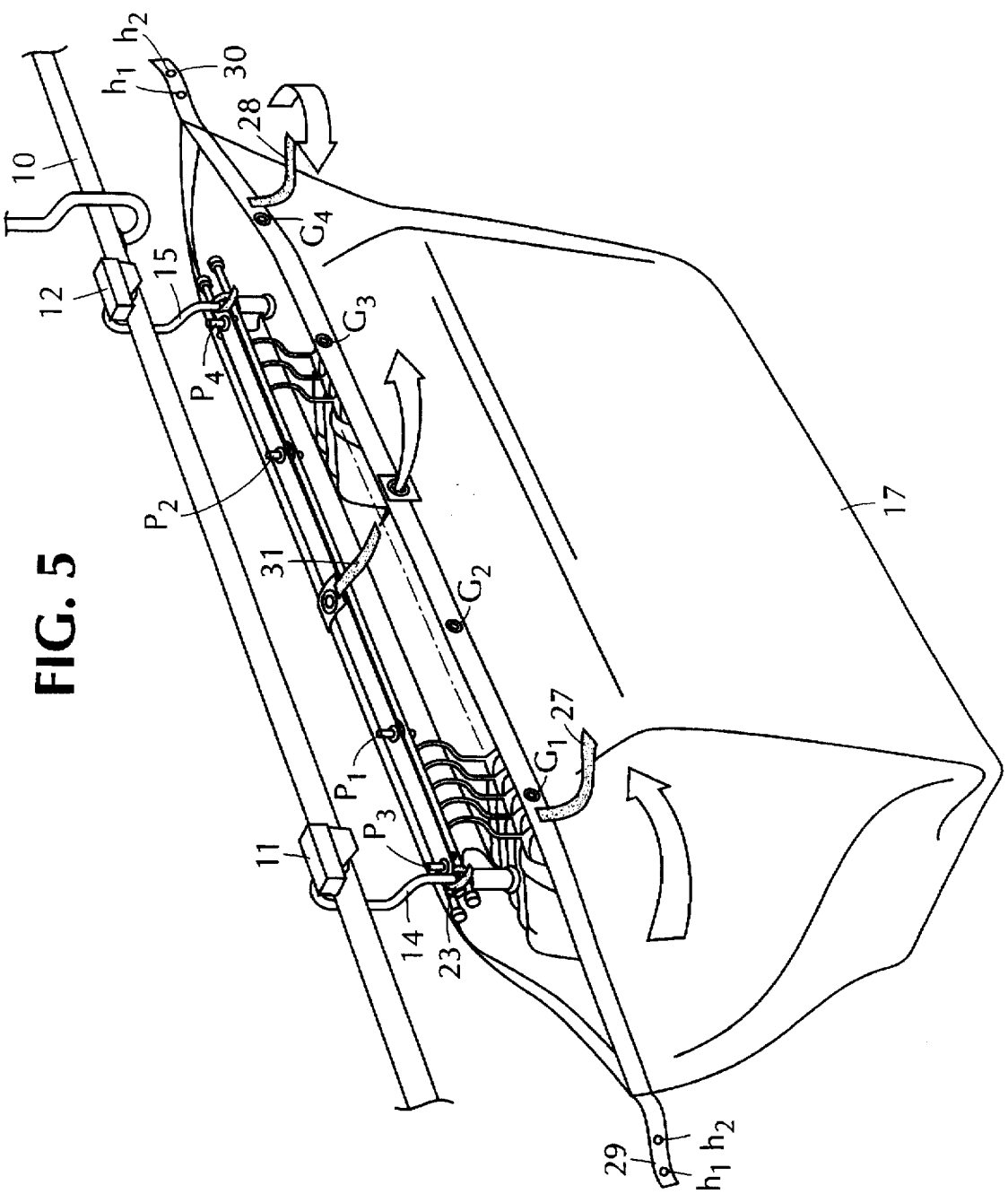

TROLLEY AND BAG ASSEMBLY FOR TRANSPORTING HANGER-HUNG GARMENTS

BACKGROUND OF INVENTION

1. Field of Invention

This invention relates generally to the conveyance of hanger-hung garments, and more particularly to a trolley and bag assembly to transport hanger-hung garments on overhead rails from an initial point to other points, the garments being protectively shrouded by the bag in the course of transit.

2. Status of Prior Art

In the garment trade, garments manufactured in a factory must ultimately reach retail facilities where they are offered for sale to consumers. The trade is therefore faced with the problem of how best to transport factory-produced garments which leave the factory on hangers from this initial point to various intermediate points such as distribution centers and warehouses, and then to its final destination such as a retail store, and to do so in a manner maintaining the transported garments in a clean and marketable condition.

To this end, the present practice is to transport a set of hanger-hung garments on a trolley that runs on an overhead rail, each hanger in the set being hooked onto the load bar of the trolley. Typically, a rail at the factory site leads to the terminal provided with a truck-loading platform. This terminal, when a delivery truck arrives at the platform, is connectable to a series of short trolley rails mounted on the ceiling of the truck. In this way, trolleys carrying hanger-hung garments can be transferred at the loading platform terminal to the delivery truck which when fully loaded carries several garment-loaded trolleys.

When a loaded delivery truck arrives at an unloading platform at a distribution center or other point, the trolleys carrying the garments must be rolled out of the truck onto the unloading platform where another rail is provided for transporting the trolleys to the next processing point. This processing point may be a warehouse to temporarily store the trolleys or a final destination, this being a retail establishment at which the garments are removed from the trolley and put on sale.

In using trolleys in this manner, one must take into account the need to maintain the garments hung from the load bars in a clean state despite the fact that in the course of transit the garments are exposed to an indoor as well as an outdoor atmosphere that may be dusty or dirty. In order, therefore, to protect the hanger-hung garments from atmospheric contamination, it is the usual practice to suspend from the trolley a bag that protectively enshrouds the set of garments hooked onto the load bar.

Of prior art interest is the 1978 Usner U.S. Pat. No. 4,079,840 which discloses a trolley for hanger-hung garments that runs on an overhead rail and is provided with a load bar on which the hangers are hooked. A similar trolley is disclosed in the 1979 patent to Usner U.S. Pat. No. 4,140,163.

Both Usner patents are concerned with the possible displacement of the hanger-hung garments from the load bar in the course of transit, for should the garments as a result of jostling and jarring of the trolley in the course of transit bounce off the load bar and fall to the floor of the truck or on the ground, the garments may then become soiled. It then becomes necessary to launder or dry clean the garments so as to restore them to a saleable condition.

In order to prevent displacement of hanger-hung garments hooked onto the load bar of the trolley, the Usner '840 patent provides a bridle for this purpose. This bridle must first be hooked onto the load bar and then bolted thereto to clamp the hooks of the hangers and thereby prevent their displacement in the course of transit. The drawback of this bridle arrangement is that it requires an operator's time and effort when loading a set of garments on the load bar to hook and bolt the bridle, and when unloading to then unhook and unbolt the bridle.

In the Usner '163 patent, instead of a bridle, use is made of a hold-down bar to clamp the hooks of the hangers on the load bar to prevent displacement of the hanger-hung garments. This hold-down bar is attached to the open top end of the bag-like shroud to be coupled to the trolley to protect the garments. The hold-down bar is provided with grommets which go onto a pair of upstanding anti-slide pins anchored on the load bar. When therefore the hold-down bar attached to the bag is placed on the load bar pins, the hooks of the hangers are then clamped between the hold-down bar and the load bar, and the bag is suspended from the load bar to enshroud the set of hanger-hung garments hooked on the loadbar.

The difficulty with this integrated hold-down bar and bag arrangement is that in the course of repeated use, the fabric bag to which the hold-down bar is attached may become soiled. This makes it necessary to launder the bag so that it will not contaminate the garments which the bag is intended to protect against soiling. But because the hold-down bar is relatively rigid and is as long as the bag is wide, the bag cannot be laundered in conventional laundry equipment in which the bag must be collapsed so that it can be received in a cylindrical washing tank.

Another disadvantage of the combined bag and hold-down bar arrangement is that it is supported on a single pair of pins anchored on the load bar of the trolley. This does not afford a secure support for the bag suspended from the load bar.

SUMMARY OF INVENTION

In view of the foregoing, the main object of this invention is to provide an improved trolley and bag assembly for safely transporting a set of hanger-hung garments which overcomes the drawbacks of prior art assemblies.

More particularly, an object of this invention is to provide an assembly of the above type in which the trolley includes a retractable hold-down bar which cooperates with the load bar of the trolley to clamp the hooks of the garment hangers and thereby prevent displacement of the hangers.

A significant feature of the invention is that the retractable hold-down bar may be retrofitted on an existing trolley having a load bar so that it is not necessary to newly manufacture a trolley in accordance with the invention.

Also an object of the invention is to provide an assembly in which the trolley has two pairs of pins to securely retain a bag suspended from the trolley, one pair of pins being anchored on the load bar and the other on the hold-down bar.

Yet another object of this invention is to provide an assembly of the above-type whose bag has no hold-down bar attached thereto and may therefore when soiled, be laundered without difficulty.

Briefly stated, these objects are attained by a trolley and bag assembly adapted to transport hanger-hung garments on overhead rails from an initial point to other points, the bag protectively shrouding the transported garments. The trolley includes a spaced pair of rolling sheaves that ride on the rails and a pair of side arms depending from the sheaves to support a horizontal load bar onto which is hooked a set of hanger-hung garments. Bridging the side arms is a retractable hold-down bar which when raised above the load bar then permits the hangers to be hooked onto the load bar, and when lowered, then clamps the hooks of the hangers so that the garments cannot be dislodged from the trolley.

The load bar is provided with a pair of upright pins which project through openings in the retractable hold-down bar when the hold-down bar is seated on the load bar, the hold-down bar having a pair of upright pins anchored thereon, thereby forming a row of four spaced pins which support grommets attached to the open upper end of the bag to securely suspend the bag from the trolley.

BRIEF DESCRIPTION OF DRAWING

For a better understanding of the invention, as well as further features thereof, reference is made to the detailed description thereof to be read in connection with the annexed drawings wherein:

FIG. 3 separately shows the hold-down bar;

FIG. 4 shows the hold-down bar in its operative position on the load bar of the trolley with the bag in its fully open condition;

FIG. 5 shows the first step that is taken to couple the bag to the trolley; and

DETAILED DESCRIPTION OF INVENTION

Structure of Assembly

Figure 1:
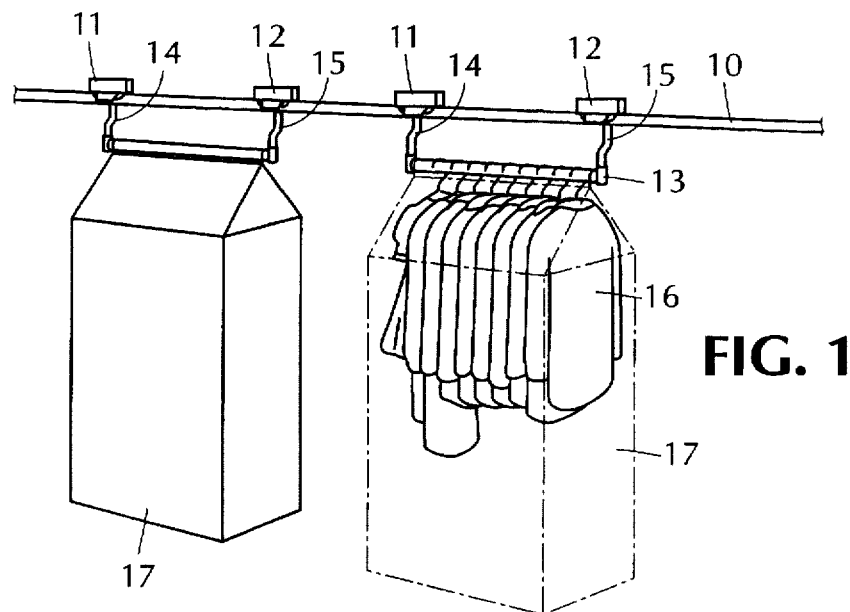
FIG. 1 schematically shows two like trolley and bag assemblies in accordance with the invention riding on an overhead rail.

FIG. 1 shows two identical trolley and bag assemblies in accordance with the invention riding on a tubular overhead rail 10. Overhead rail 10 represents any rail section on which the trolleys run in the course of transit from a factory where the garments are produced and there hung on hangers, to intermediate points such as distribution centers and warehouses, and then to a final destination such as retail store.

Each trolley is provided with a spaced pair of rolling sheaves 11 and 12 whose grooved wheels ride on the tubular rail 10 and a horizontal load bar 13 supported by side arms 14 and 15 which depend from the sheaves, and have a J-formation to place load bar 13 in the same vertical plane as rail 10. Load bar 13, as shown in FIG. 2, has anchored thereon a pair of special upright inner pins $P_1$ and $P_2$.

Hooked on load bar 13 is a set of hanger-hung garments 16 suspended from the trolley. And protectively enshrouding the set of suspended garments is a fabric bag 17, to be later described in greater detail.

Figure 2:
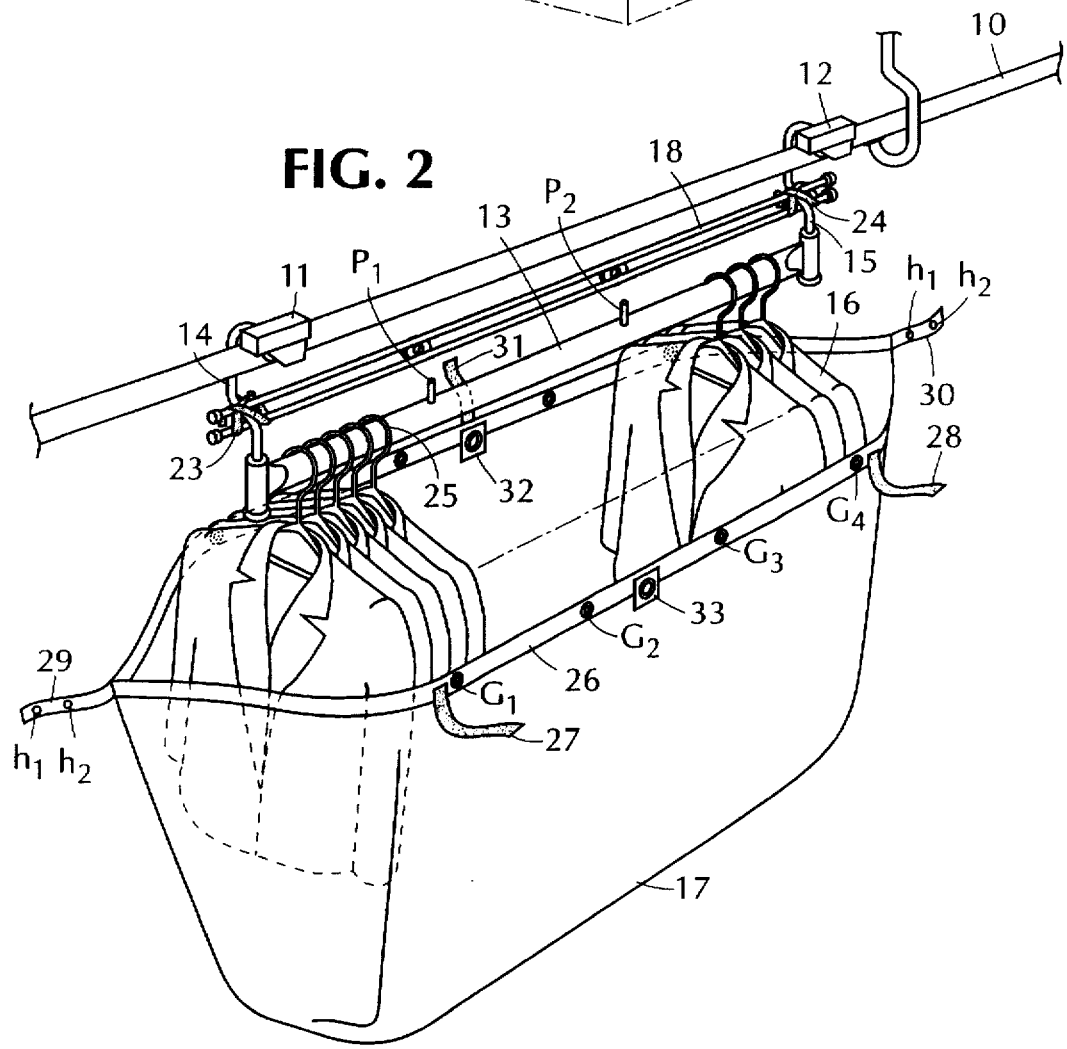
FIG. 2 is a perspective of the the trolley with its retractable hold-down bar raised above the load bar of the trolley.

In order to prevent the hanger-hung garments 16 from bouncing off load bar 13 in the course of transit in which the trolley on the rail may be jostled or jarred, also provided a retractable hold down bar 18 which bridges side arms 14 and 15 and which when in its raised position above load bar 13 as shown in FIG. 2 then bridges the intermediate sections of these arms to permit an operator to hook the hanger-hung. garment 16 on the load bar.

As best seen in FIG. 3, hold-down bar 18 is formed by a pair of like parallel metal rods 19 and 20 whose length is somewhat longer than the distance between side arms 14 and 15 of the trolley. Attached to the ends of rods 19 and 20 are protective plastic hollow caps C having a metal base with a center hole and slots radiating therefrom so that the caps can be push-fitted onto the ends of the rods.

Bridging the parallel rods 19 and 20 are welded thereto adjacent their opposite ends are short transverse rods 21 and 22. Welded to transverse rods 21 and 22 at their midpoints are upright outer pins $P_3$ and $P_4$. Also bridging the rods and welded thereto are metal washers $W_1$ and $W_2$ whose openings are aligned with pins $P_1$ and $P_2$ projecting above load bar 13. Hence when the hold down bar 18 rests on the load bar 13 as shown in FIG. 4, there is then presented a row of pins formed by outer pins $P_3$ and $P_4$ and inner pins $P_1$ and $P_2$.

Hold-down bar 18, as best seen in FIG. 3, has attached to opposite ends of rod 19 VELCRO fabric fastener straps 23 an 24 one side of which is formed by a myriad of minute hooks constituting the male component of the fastener, the other side being formed by a myriad of minute loops constituting the female component. The leading end of each VELCRO strap is folded over and sewn to create a loop encircling the end of rod 19 to attach the strap thereto.

When hold down bar 18 is retracted to a raised position as shown in FIG. 2, it is held in place on the horizontal intermediate section of the trolley side arms 14 and 15 by the VELCRO straps 23 and 24 which are then wound about these bars, with the male component of the straps in engagement with the female component so that in order to uncoil the straps, the straps must first be disengaged. The operator is then free to suspend a set of hanger hung garments 16 on load bar 13, the hooks 25 of the hanger being hooked on the load bar to suspend the garments therefrom, as shown in FIG. 2.

Bag 17 for protectively enshrouding the set of hanger-hung garments has a generally box-like form to accommodate the garments. The open mouth at the top of this bag is provided with a reinforcing hem 26, each side of which has four grommets $G_1$ to $G_4$ attached thereto at positions in alignment with those of pins $P_1$ to $P_4$.

Attached to the front side of hem 26 at opposite ends thereof are VELCRO straps 27 and 28. And attached to the opposite ends of the bag at their midpoints on hem 26 are fabric straps 29 and 30. Each strap is prowided with a pair of spaced holes $h_1$ and $h_2$ to receive the inner pins $P_1$ and $P_2$.

Also provided on bag 17 is a VELCRO strap 31 attached to a large grommet 32 at the center on the rear side of hem 26. Strap 31 is adapted to go through a corresponding grommet 33 on the front side of the bag to retain a tag T, serving to identify the contents of the loaded trolley.

Loading Procedure

An operator who wishes to load a trolley with a set of hanger-hung garments ordered by a particular store makes use for this purpose of a trolley as shown in FIG. 2. This trolley is in condition for loading in that the hold-down bar 18 is retracted with respect to the load bar 13 and the operator can therefore hook the hanger-hung garments on the load bar.

Upon completion of this loading operation, the operator then unties VELCRO straps 23 and 24 so as to release the hold-down bar 18 which he then lowers on side arms 14 and 15 onto load bar 13 so that now the hooks of the hangers are clamped by the hold down bar to prevent the hangers from slipping off the load bar.

At this stage in the procedure, the trolley is in readiness for the fabric bag 17, for the operator is now presented for the purpose with the inner pins $P_1$ and $P_2$ which project through washers $W_1$ and $W_2$ in the hold-down bar, and the outer pins $P_3$ and $P_4$ which project above the hold down bar.

The next step is to pull the bag 17 upwardly to cover the set of hanger-hung garments 16, as shown in FIG. 4, and then as shown in FIG. 5 to place the grommets $G_1$ and $G_4$ on the front and rear sides of the mouth of the bag over pins $P_1$ to $P_4$, thereby closing the sides of the bag.

Figure 6:
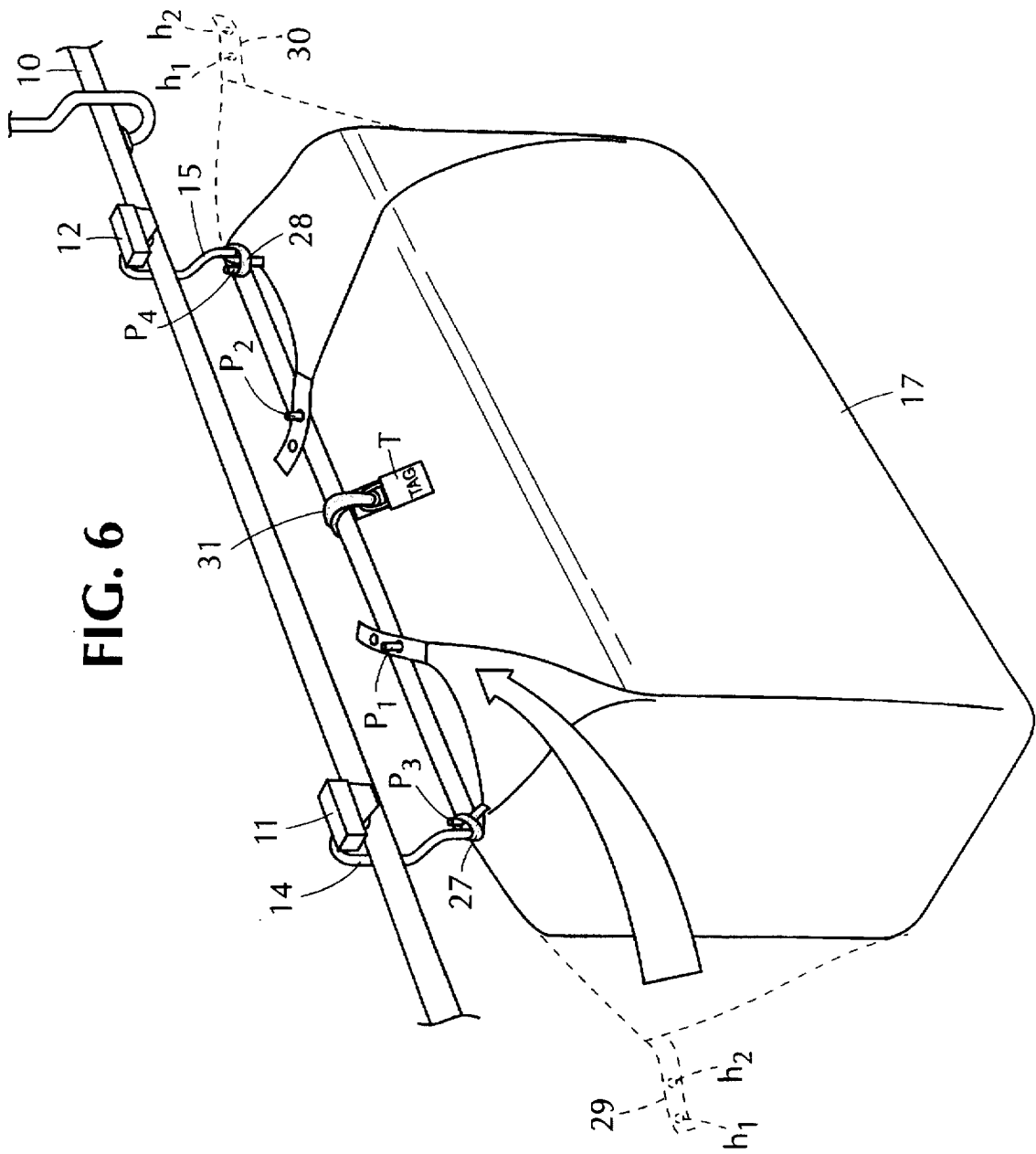
FIG. 6 shows the bag coupled to the trolley in its closed state.

Then the straps 29 and 30 on the ends of the bag are pulled over and hooked onto the inner pins $P_1$ and $P_2$, as shown in FIG. 6, to completely close the bag over the garment-hung grommets. And finally strap 30 is passed through grommets 32 and 33 to tie tag T to the bag to identify the contents thereof.

Thus the bag which protectively enshrouds the hanger-hung garments is securely fastened to the trolley, and the garments cannot slip off the load bar however vigorously the garments are jostled in the course of transit. Yet when the trolley has arrived at its final destination, the bag can be readily detached from the trolley and the hanger-hung garments can be removed from the load bar without difficulty.

While there has been shown and described a preferred embodiment of a trolley and bag assembly for transporting hanger-hung garments in accordance with the invention, it will be appreciated that many changes and modifications may be made therein without, however, departing form the essential spirit thereof.

I claim:

1. A trolley and bag assembly for transporting along an overhead rail a set of garments each hung on a hanger having a hook; said assembly comprising:

A. a trolley provided with a pair of spaced sheaves riding on the rail and a pair of arms depending from the sheaves to support below the rail a horizontal load bar;

B. a retractable hold-down bar bridging the pair of arms, said hold-down bar being raisable to a raised position to permit the hooks of the set to be hooked onto the load bar to suspend the garments therefrom, and being lowerable to a lowered position to clamp the hooks onto the load bar to prevent displacement of the garments; and C. a bag having an open upper end raisable over the garments to enshroud the set, said bag being provided with detachable means to secure the bag to the trolley.

2. An assembly as set forth in claim 1, in which each side arm is provided with an intermediate horizontal section on which said hold-down bar rests in its raised position.

3. An assembly as set forth in claim 2, in which said hold-down bar is provided at each end thereof with a strap which is tied onto said horizontal section to retain said hold-down bar in its raised position.

4. An assembly as set forth in claim 1, in which the hold-down bar is formed by a pair of parallel rods having a length somewhat greater than the distance between the side arms, and a pair of transverse rods joined to the parallel rods adjacent their opposite ends to define a pair of extensions which straddle the side arms to maintain the hold-down bar on the side arms.

5. An assembly as set forth in claim 4, in which the load bar is provided with a pair of spaced upright inner pins which project through a pair of washers joined to the parallel rods of the hold-down bar in the lowered position. thereof.

6. An assembly as set forth in claim 5, in which each transverse rod of the hold-down bar has an upright outer pin anchored thereon whereby in the lowered position of the hold-down bar there are then presented a row of four pins to support the bag.

7. An assembly as set forth in claim 6, in which the open upper ends of the bag are provided on either side thereof with a row of four grommets that fit onto the row of four pins.

8. An assembly as set forth in claim 7, in which the upper end of the bags is provided with a pair of end straps, each having a hole therein that fits onto a respective inner pin.

9. An assembly as set forth in claim 7, in which the bag is formed of fabric and has a box-like shape to accommodate the set of garments.

* * * * *